July 5, 1927.
J. I. HULL
1,634,944
ALTERNATING CURRENT MOTOR
Filed April 23, 1924
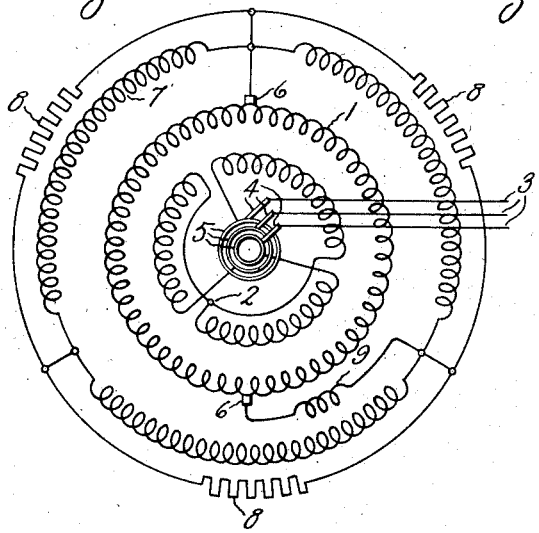
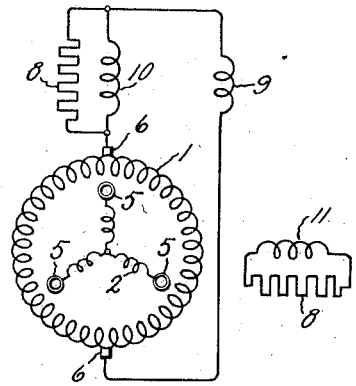
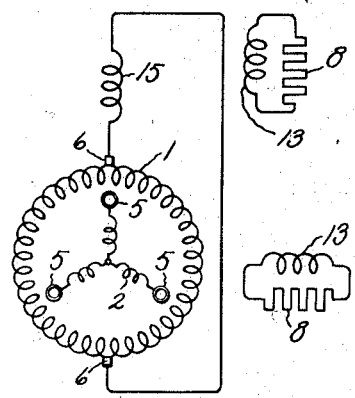
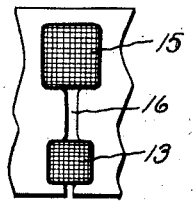
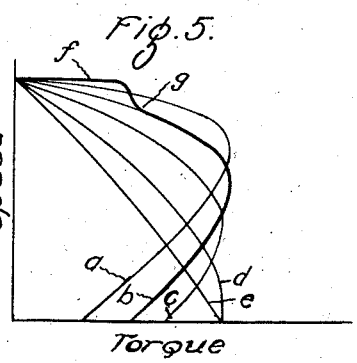
Inventor:
John I. Hull,
by *Alexander S. Lane*
His Attorney.

Patented July 5, 1927.

1,634,944

UNITED STATES PATENT OFFICE.

JOHN I. HULL, OF SCHENECTADY, NEW YORK, ASSIGNOR TO GENERAL ELECTRIC COMPANY, A CORPORATION OF NEW YORK.

ALTERNATING-CURRENT MOTOR.

Application filed April 23, 1924. Serial No. 708,552.

My invention relates to alternating current motors arranged to start with induction motor characteristics, and has for its object the provision of an improved motor capable of being accelerated from rest to synchronous speed without the use of external devices.

It is well known that the operating characteristics of a synchronous motor and an induction motor differ both with respect to the torque available at starting and the magnetizing current taken from the line during normal operation. The synchronous motor when brought up to speed will operate at a power factor dependent on the value of its exciting current but has no starting torque except as developed by simultaneous induction motor action. The induction motor is capable of starting under load. In order to bring the synchronous machine up to speed, it has therefore been customary to start it with its field circuit open and arranged to prevent the production of excessive voltage by transformer action and to use a compensator for controlling the voltage applied to its armature winding. With this arrangement the machine is started as an induction motor, the damper windings serving as a short-circuited secondary circuit. The starting torque thus produced is somewhat augmented by the eddy currents set up in the pole faces of the machine. When the machine has come up to speed as an induction motor, direct current is supplied to its field circuit and it pulls into synchronism. It has also been proposed to start the synchronous motor with single phase current of slip frequency supplied to its field circuit, the field excitation being reversed in time harmony with the passage of the polar regions of the rotating armature field over the faces of the exciting field poles. This method of starting has the disadvantage that, due to the changing frequency of the exciting current, adjustable external reactors and resistors must be used to maintain the proper phase relation between the exciting field and the rotating field of the armature. With either method of starting the exciting current may be supplied either from a separate exciting machine or from a commutator winding placed on the armature core of the machine.

I propose to provide a motor which may be accelerated from rest to synchronous speed without the use of external devices. To this end I provide either a squirrel cage winding having sufficient resistance to produce the required starting torque or a secondary winding permanently connected across a resistor for producing the torque at starting, and so interrelate the impedance of the exciting and starting windings as to preclude the flow of excessive current in the exciting circuit during the starting period, thus eliminating injurious sparking at the commutator of the exciting winding when the field current is of high frequency and producing a phase relation between the exciting current and the rotating field of the armature required to pull the machine into synchronism when it has come up to speed as an induction motor.

My invention will be better understood on reference to the following description when considered in connection with the accompanying drawing and its scope will be pointed out by the appended claims.

Referring now to the drawing, Fig. 1 is a diagrammatic representation of a motor in which my invention has been embodied; Fig. 2 shows a motor which differs from that shown by Fig. 1 in respect to the arrangement and number of phases of the stator winding; Fig. 3 shows a different arrangement of the stator winding; Fig. 4 is a sectional view showing the arrangement of the windings in the stator slots; and Fig. 5 shows various curves illustrating the operating characteristics of the motor.

Fig. 1 shows a motor the rotor member of which is provided with a commutator winding 1 and a polyphase winding 2 arranged to be supplied with alternating current through leads 3, brushes 4 and slip rings 5. A pair of brushes 6 are operatively associated with the commutator of the winding 1 to interconnect it with the polyphase stator winding 7 which functions both as a starting and direct current field winding. Each phase of the stator winding 7 is permanently connected across a different one of the resistors 8. Impedance means illustrated as a reactor 9 is connected in series with the brushes 6 for the purpose of reducing the flow of high frequency current in the circuit of the commutator winding at starting, which reaction disappears at synchronous speed and thus permits exciting current at starting to flow and synchronize the machine.

With this arrangement the machine will start substantially like an induction motor with its secondary winding connected across the resistors 8, the magnitude of the resistance of which must be a compromise between that required to give maximum starting torque and that which does not give a slip large enough to prevent the motor from changing from induction to synchronous motor operation under heavy loads. As the motor comes up to speed the frequency of the current supplied through the brushes 6 decreases until at synchronism the frequency is zero and direct current is supplied from the winding 1 to the winding 7. Under these conditions the reactor 9 offers no opposition to the current supplied to the winding 7, the resistance of which is low enough as compared with that of the resistors 8, to insure that a comparatively small amount of energy will be consumed in the rheostats under normal running conditions.

Fig. 5 shows a plurality of curves $a$ to $e$ inclusive illustrating the starting characteristics of the motor for different values of resistance in the resistors 8 connected across the different phases of the winding 7. The horizontal curve $f$ is drawn to indicate the synchronous speed of the machine. If the resistors 8 are given a value of resistance corresponding to the curve $b$, for example, the motor will follow this curve approximately until the point $g$ at which the motor tends to synchronize is reached when it will change over to synchronous speed and operate on the curve $f$.

The motor illustrated by Fig. 2 is provided with a stator circuit comprising the two separate phase windings 10 and 11 arranged in quadrature with each other and each permanently short-circuited by a resistor 8. It will be apparent that these windings may be replaced by a high resistance squirrel cage winding if desired. During starting the windings 10 and 11 function as a two phase short-circuited secondary winding. When normal running conditions have been attained the direct current excitation for the motor is produced through the winding 10 alone, and the winding 11 does not aid in the production of torque because of the fact that the rotating field produced by the winding 2 is stationary in space. The reactor 9 functions in the same manner as in the arrangement shown in Fig. 1.

Fig. 3 shows an arrangement of the motor windings which differs from that of Fig. 2 in that independent and permanently short-circuited stator windings 13 are provided for starting purposes alone, a separate winding 15 being arranged to provide the excitation of the machine. Like the winding 11 of Fig. 2 the windings 13 of Fig. 3 do not aid in the production of torque during synchronous operation, but since they are permanently short-circuited they obviously function to prevent hunting in a manner similar to the usual damper winding of the synchronous machine.

As illustrated in Fig. 4 the windings 13 are preferably placed in a set of peripheral slots near the air gap while the winding 15 is placed in a set of deeply embedded slots, pairs of radial slots in the different sets being interconnected by a narrow slot 16 for the purpose of making the reactance of the winding 15 high as compared with that of the windings 13. With this arrangement the reactor in the exciting circuit of the machine may be omitted. Under these conditions the motor starts mainly as an induction motor, the windings 13 serving as the secondary circuit and the resistors 8 as the starting resistance. Due to the comparatively high impedance of the winding 15 the current in it is limited to a comparatively low value during the starting period. The resistors 8 could be omitted if desired and a squirrel cage winding of suitably high resistance substituted for 13.

I have explained my invention by illustrating and describing certain specific embodiments thereof, but it will be readily understood by those skilled in the art that the invention may be embodied in many other forms than those shown and described. I, accordingly, do not wish to be restricted to the particular forms of construction disclosed herein by way of example for the purpose of setting forth my invention in accordance with the patent statutes. The terms of the appended claims are, therefore, not restricted to the precise structure disclosed, but are intended to cover all changes and modifications within the spirit and scope of my invention.

What I claim as new and desire to secure by Letters Patent of the United States is:

1. An alternating current motor comprising two relatively movable polyphase windings inductively associated with each other to produce torque for accelerating said motor; an exciting circuit including a commutator winding inductively and immovably associated with one of said polyphase windings for supplying the excitation of said motor; means permanently associated with said circuit for limiting its current during acceleration of said motor; and means permanently connected across the different phases of the other of said polyphase windings for improving the starting characteristics of said motor.

2. A synchronous motor comprising two relatively movable polyphase windings inductively associated with each other to produce torque for accelerating said motor; an exciting circuit including a commutator winding immovably associated with one of said polyphase windings and a field winding inductively and immovably associated with the other of said polyphase windings for carrying direct current excitation for said motor, said exciting circuit being arranged to limit the current in said circuit during acceleration of said motor, and resistors permanently connected across the different phases of the other of said polyphase windings for improving the starting characteristics of said motor.

3. An alternating current motor comprising a winding adapted to be supplied with polyphase alternating current; an exciting circuit including a commutator winding inductively and immovably associated with said polyphase winding and a field winding arranged in a set of deeply embedded slots and movably related to said polyphase winding for carrying direct current excitation for said motor and a starting winding arranged in a set of peripheral slots, radial pairs of slots in the two sets being interconnected by slits for increasing the magnetic leakage between said starting and field windings during acceleration of said motor.

In witness whereof, I have hereunto set my hand this 22nd day of April, 1924.

JOHN I. HULL.